(12) United States Patent
Kim et al.

(10) Patent No.: US 9,725,340 B2
(45) Date of Patent: Aug. 8, 2017

(54) METHOD OF BUILDING MASSIVELY-PARALLEL ION CONCENTRATION POLARIZATION SEPARATION DEVICE

(71) Applicant: Massachusetts Institute of Technology, Cambridge, MA (US)

(72) Inventors: Bumjoo Kim, Melrose, MA (US); Sung Jae Kim, Melrose, MA (US); Jongyoon Han, Beford, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 60 days.

(21) Appl. No.: 14/281,985

(22) Filed: May 20, 2014

(65) Prior Publication Data
US 2014/0332386 A1 Nov. 13, 2014

Related U.S. Application Data

(63) Continuation of application No. PCT/US2012/066224, filed on Nov. 21, 2012.
(Continued)

(51) Int. Cl.
| | |
|---|---|
| *C02F 1/469* | (2006.01) |
| *B01D 65/08* | (2006.01) |
| *B01D 61/42* | (2006.01) |
| *C02F 1/00* | (2006.01) |
| *C02F 103/08* | (2006.01) |
| *C02F 101/20* | (2006.01) |
| *C02F 101/30* | (2006.01) |

(52) U.S. Cl.
CPC ............ *C02F 1/4695* (2013.01); *B01D 61/42* (2013.01); *B01D 65/08* (2013.01); *C02F 1/469* (2013.01); *B01D 2313/345* (2013.01); *B01D 2321/22* (2013.01); *C02F 1/002* (2013.01); *C02F 1/003* (2013.01); *C02F 2101/20* (2013.01); *C02F 2101/30* (2013.01); *C02F 2103/08* (2013.01); *C02F 2201/009* (2013.01); *C02F 2201/46* (2013.01)

(58) Field of Classification Search
CPC ........................... C02F 2201/46; C02F 1/469
See application file for complete search history.

(56) References Cited

U.S. PATENT DOCUMENTS 8,801,910 B2 * 8/2014 Bazant ................. B01D 61/425
204/522
2003/0226767 A1 * 12/2003 Omasa ..................... C02F 1/34
205/755
(Continued)

FOREIGN PATENT DOCUMENTS

WO WO 2010011760 A1 * 1/2010 ............. B01D 57/02

OTHER PUBLICATIONS

Kim et al, Direct Seawater Desalination by Ion Concentration Polarization, Nature Nanotechnology, vol. 5, Apr. 2010.*

*Primary Examiner* — Keith Hendricks
*Assistant Examiner* — Salil Jain
(74) *Attorney, Agent, or Firm* — Carolyn S. Elmore; Elmore Patent Law Group, P.C.

(57) ABSTRACT

Ion Concentration Polarization (ICP) purification devices and methods for building massively-parallel implementations of the same, said devices being suitable for separation of salts, heavy metals and biological contaminants from source water.

20 Claims, 13 Drawing Sheets

Related U.S. Application Data

(60) Provisional application No. 61/562,144, filed on Nov. 21, 2011.

(56) References Cited

U.S. PATENT DOCUMENTS

| | | | | |
|---|---|---|---|---|
| 2011/0192724 A1* | 8/2011 | Han | G01N 33/6803 | 204/451 |
| 2011/0198225 A1* | 8/2011 | Kim | B01D 57/02 | 204/452 |
| 2011/0308953 A1* | 12/2011 | Bazant | B01D 61/425 | 204/520 |

* cited by examiner (c)

(a)

Inlet part, 1' using Bare mesh

Top view      Bottom view (b)

Outlet part, ½' Nafion coated mesh
Calculated brine outlet around mesh (iii) Insulation layer and mesh stack bonding (iv) Cap part (anode metal mesh)

Top view     Bottom view     Side view

METHOD OF BUILDING MASSIVELY-PARALLEL ION CONCENTRATION POLARIZATION SEPARATION DEVICE

RELATED APPLICATIONS

This application is a continuation of International Application No. PCT/US12/066224, which designated the United States and was filed on Nov. 21, 2012, published in English, which claims the benefit of U.S. Provisional Application No. 61/562,144, filed on Nov. 21, 2011. The entire teachings of the above applications are incorporated herein by reference.

BACKGROUND OF THE INVENTION

Fresh water is a vital resource for human life, and is becoming increasingly precious in remote areas. The logistical challenges in supplying necessary water to remote areas notwithstanding, it is increasingly clear that the humanitarian mission of enhancing the livelihood of local populations is critically connected to the success of the fresh water supply. Due to the ever-increasing need for water, and increased awareness in worldwide water shortage problem, there have been continuous development and improvement efforts in water purification and desalination technology. The majority of the desalination industry is built around infrastructure-scale reverse osmosis (RO) technology due to its energy efficiency, with cities and governments as the main customers. However, these technologies require high pressure generation (to overcome the osmotic pressure of seawater or brackish water) and as such, inherently cater to the large, plant scale reverse osmosis operation.

Since the basic human water need is only 2.5 L per person per day, technology applications for remote locations do not necessarily require extremely large-volume purification of drinking water. Instead, portability and self-sustained (battery or solar-powered) operation, which does not require energy and/or water delivery infrastructures, is more important and critically needed. As a result, small scale, portable seawater desalination and water purification systems that can be operated independently in remote locations will be very useful in addressing the critical needs for clean water, including disaster-stricken areas or other remote, resource-limited settings.

In addition to water shortage just discussed, heavy metal contamination in ground water is a well-documented problem in certain parts of the developing world[10]. Long-term chronic exposure to the contaminants in drinking water, even at low concentrations, presents significant health risks to humans, because they form complexes with proteins and peptides via reacting with carboxyl (—COOH), amine (—NH2), or thiol (—SH) groups[11]. When these metals bind to these groups, the modified biomolecules change structure and lose their function, or form cytotoxic free radicals. Arsenic, cadmium and lead are the most common heavy metal contaminants found in groundwater. Specifically, arsenic exposure through groundwater has been a major health problem in several countries around the world, including the US, Mexico, India, Mongolia, Argentina, Chile and Bangladesh[12]. In particular, arsenic contamination affects approximately 30% of engineered groundwater supplies in Bangladesh[13], and an estimated 35-77 million people in Bangladesh have been exposed to toxic levels of arsenic (>0.05 mg/L)[12]. Chronic arsenic exposure over this level can cause lung, bladder and kidney cancer as well as skin-related cancer and diseases such as hyperkeratosis, lesions and pigmentation changes.[10, 11] Cadmium compounds are commonly used in industry for electroplating, smelting, alloy manufacture, color pigments, plastic and batteries[10,14]. Adverse health effects to cadmium include kidney damage, skeletal damage, hypertension and cancer.[10,11,14] Lead compounds are also often found in waste streams from industries such as mining, smelting, welding and battery plants[10]. Lead poisoning in infants and children delay physical or mental development and affect their attention span, learning abilities and behavior. In adults, prolonged exposure to lead can lead to kidney problems, high blood pressure, memory deterioration, extended reaction time and reduced ability to comprehend.[10,15]

Given the highly toxic nature of these heavy metal elements, and the economic factors relevant to the regions suffering from groundwater contamination, developing an efficient, low-cost heavy metal removal process would be desirable. Current methods for heavy metal removal rely on coagulation-precipitation of metal contaminants, induced by adding chemical coagulants, followed by filtration of solids. While this technique is widely used and could potentially be implemented relatively inexpensively[16-18], multiple coagulant chemicals should be used for different metal contaminants.

Membrane processes (such as reverse osmosis) are widely used for seawater desalination, but require expensive water purification and delivery infrastructures. In addition, the membrane is prone to fouling, and heavy metal rejection rates could decrease over time[19]. Electrochemical methods, such as electrocoagulation and electrodialysis are also used[20], with several advantages such as less stringent requirement for waste management. However, these electrochemical methods generally involve higher power consumption than other methods, especially when the source water salinity is high (brackish or sea water). Recent results of separating E. coli and red blood cells from a source water clearly demonstrated that ICP can also affect (potentially pathogenic) cells and biomolecules[21]. Therefore, the technology has a potential for a portable, small-scale (sufficient for a person or family), self-powered (either by battery or solar cells) seawater desalination and disinfection system, which is not currently existent.

SUMMARY OF THE INVENTION

The present invention is directed to Ion Concentration Polarization (ICP) purification devices and methods for building massively-parallel implementations of the same.

Ion concentration polarization (ICP) is an electrochemical transport phenomenon that occurs when ion current is passed through an ion-selective membrane or nanoporous junction. Preferably, the membrane conducts only cations (in the case of a cation exchange membrane) so that a significant concentration gradient is developed at both sides of the membrane. Once ICP is triggered, the concentrations of both cations and anions decrease on the anodic side (ion depletion). In addition, any charged species will also be depleted along with the ions in order to match electro-neutrality. Though bulk membrane systems may display the same phenomena under certain conditions, the depletion layer is usually negligible due to its micro-size dimension. Utilizing a microfluidic network system with a channel dimension in the range of 100 μm~1 mm and a pressure or gravity-driven flow for a well-defined steady state layer, collection of the desalted fluid inside the depletion zone is enabled. This provides a mechanism for continuous desalination and purification. Further, most biological contaminants such as red blood cells, bacteria and viruses can be separated with salts. An important characteristic of this arrangement is that salt ions (and other charged debris) are driven away from (not towards) the membrane, significantly reducing the potential for membrane (nanojunction) fouling. Therefore, an ICP implementation as described, significantly reduces the possibility of membrane fouling and salt accumulation, thus avoiding two problems that plague other membrane filtration methods.

To implement this approach, the Han group has recently developed a single-unit microfluidic device shown to be capable of continuous desalination of real seawater samples. The ICP core mechanism is described in international patent applications PCT/US/2009/51420, PCT/US2011/027883, and U.S. patent application Ser. No. 12/409,447, which are incorporated herein by reference in their entirety.

To quantify the concentration in the desalted stream, in situ conductivity measurements of the desalted stream were carried out using an embedded microelectrode. When an above-threshold voltage was applied and the ion depletion zone established, the conductivity of the output desalted stream dropped to ~0.5 mS/cm from ~45 mS/cm (the conductivity of the original seawater) at 50% recovery rate. In another experiment using 100 mM phosphate buffer solution (~15 mS/cm, a model for brackish water), the conductivity of the output desalted stream was also reduced, to ~0.3 mS/cm. The flow rate at the desalted stream realized in this initial proof-of-concept device was ~10 uL/min (the inlet flow rate was 20 μL/min, equally split into two 10 μL/min streams), with $|E|\approx 75V/cm$. The total power consumption was measured to be less than 3.5 Wh/L, which is comparable to current state-of-the-art reverse osmosis systems and could be powered by a conventional battery or solar cell panel.

The presented ICP mechanism is attractive to resource limited settings since it can be operated at a scale for optimal production of water at high energy efficiency. In addition, it only requires electricity and does not require moving parts or pumps. However, though approximately 2.5 L per person per day is required, the single ICP-chip unit in the prior art does not have a large enough output for human survival. Thus, the ICP device needs to be scaled-up.

Maximization of throughput for a suitable portable desalination/purification system can be achieved by the parallel multiplexing of the unit device. In one embodiment, or first generation, the device has planar water flow along a plurality of microchannels. In a second embodiment, the device is configured to favor gravitational feeding and separation. This design is more amenable for industrial scale water flows, and incorporates an alternative device design that parallelizes the ICP effect.

This invention has several important improvements in ICP desalination system technology. It can overcome the low-throughput issues of the prior devices by employing inexpensive, commercially available meshes, while maintaining the desalting efficiency. The simplified device (no liquid buffer channel) design also enables one to design a final product with maximum flexibility. This mesh structure are massively parallelized but can also be massively parallelized themselves into variably sized arrays, to provide fresh water flows for any type of demand from facility scale (e.g. a laboratory) to municipal scale (e.g. aircraft carrier). Any cleanroom fabrication steps were not involved so that one can fabricate with minimum cost. For example, the total cost for building the ¼ inch outlet prototype was ~$0.30 excluding labor and machine charge. Therefore, this invention is immediately applicable to small/medium scale water purification markets.

Thus, the invention provides for a water separation device, such as a microporous device, comprising:
   a chamber characterized by an inlet port, a bottom support and a volume to receive water comprising ions to be separated, such as a brine;
   wherein said bottom support comprises a porous ion concentration polarization matrix configured to permit water depleted in said ions to exit the chamber and at least one outlet for concentrated water stream comprising said ions;
   at least one anode and at least one cathode each functionally connected to said ion concentration polarization matrix.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Thus, the invention provides for a water separation device, such as a microporous device, comprising:
   a chamber characterized by an inlet port, a bottom support and a volume to receive water comprising ions to be separated, such as a brine;
   wherein said bottom support comprises a porous ion concentration polarization matrix configured to permit water depleted in said ions to exit the chamber and at least one outlet for concentrated water stream comprising said ions;
   at least one anode and at least one cathode functionally connected to said ion concentration polarization matrix.

Figure 3:
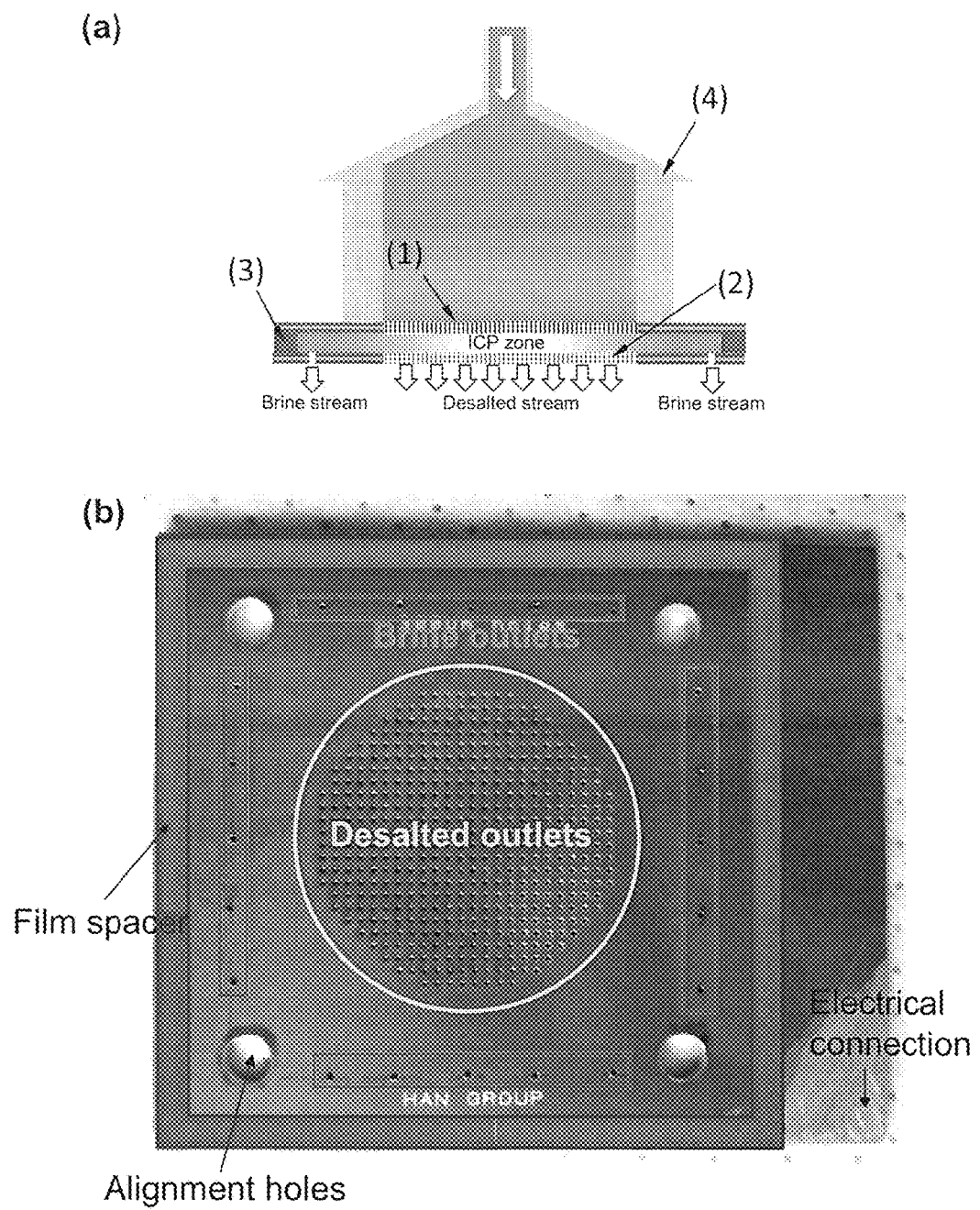
FIG. 3 depicts (a) schematic diagram of PCB based metal buffer system and (b) layout of bottom PCB plate.
Figure 3:
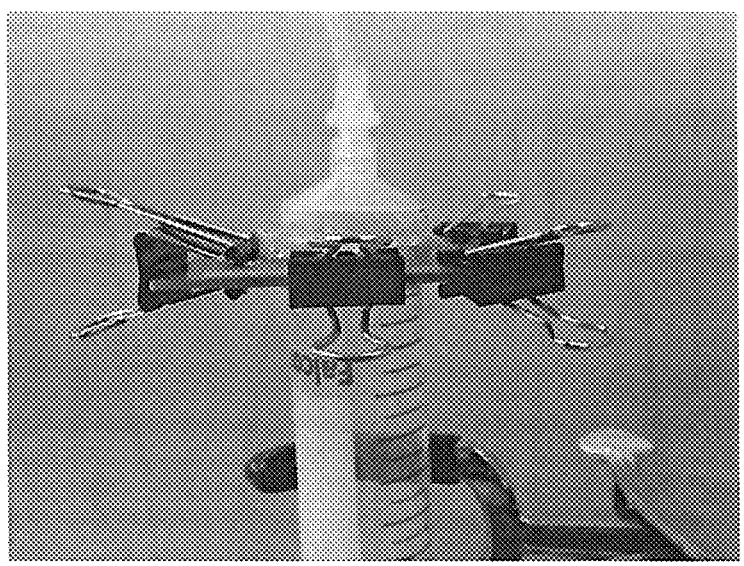
Figure 3:
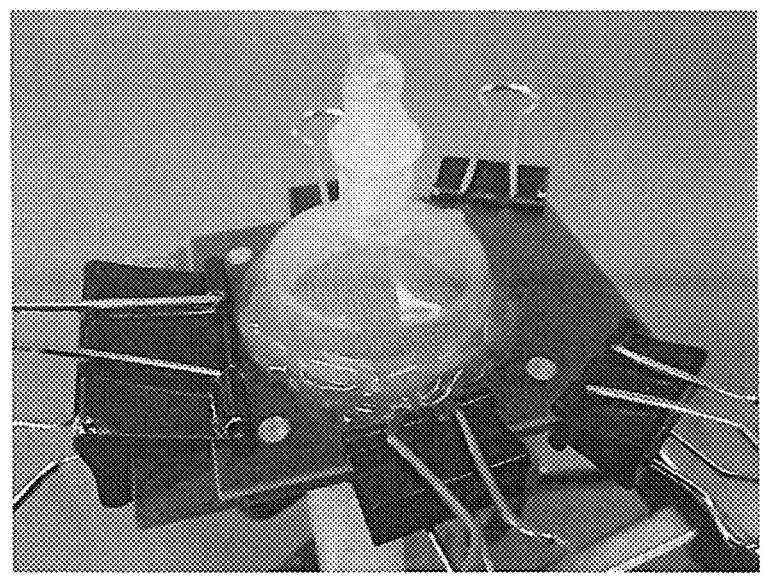

Referring to FIG. 3, the chamber 4 is preferably located above the bottom support 5 to permit gravity to cause the water to flow through the device. The chamber further defines a volume 6 to receive and hold water to be purified. The volume of the chamber is not critical to its utility. In designing devices for personal use, the volume can be less than 1 liter, such as less than 0.5 liters. The material used to manufacture the chamber is also not critical. In general, the chamber is made of non-conductive material and/or lined with non-conductive material, such as polyethyleneterephthalate (PET).

The chamber is characterized by an inlet port 7 to receive the water to be purified. The chamber can be designed to be a closed system (for example, where the inlet port receives a conduit optionally controlled by a valve) or an open system (for example, where the inlet port is the open end of a graduated cylinder where the water is poured into the volume).

The chamber volume is further defined by a bottom support 5. The bottom support comprises a porous ion concentration polarization matrix configured to permit water depleted in said ions to exit the chamber and at least one outlet for concentrated water stream comprising said ions. The matrix is preferably a mesh, such as a conductive metal mesh or a mesh coated with a conductive material or polymer. Alternatively, the matrix can be a plate configured with a matrix of holes where the holes or plate are coated with an ion selective material. Alternatively, the matrix can be a microporous material with randomly distributed holes and inherent conductivity through the material. The matrix can be a separate material and fitted into or on the support. Alternatively, the matrix can be an integral part of the support and molded as a single piece.

Preferably, the diameters of the holes in the porous ion concentration polarization matrix 2 comprises are less than about 500 microns, preferably less than 300 microns. Mesh is preferred as the open surface area permits a greater flow rate. Preferably, the matrix comprises at least one layer of a mesh with microscopic holes partially or entirely coated with an ion selective material. The mesh material itself can be conductive or non-conductive. In one embodiment, the matrix can comprise a plurality of layers of mesh characterized by the same or at least two different hole sizes. Alternatively, the porous ion concentration polarization matrix comprises a plurality of microchannels (less than 500 microns), or nanofilters, e.g., of less than 100 nm in diameter.

The size of the matrix will generally depend on the volume of the chamber and the desired rate of flow. For an individual-sized device, the ion concentration polarization matrix will preferably have a surface area of at least about 3 $cm^2$, preferably at least about 5 $cm^2$, such as at least about 200 $cm^2$.

In one embodiment, the anode is comprised of a conductive metal mesh and is positioned proximate to the inlet port. Referring to FIG. 3, the anode 1 is located on the top face of the bottom support 5 and assists in defining the ICP, or ion depletion, zone. See also FIG. 1.

The device also contains an outlet for collecting a purified water stream and at least one outlet for collecting ions and impurities in a concentrated water stream. The outlet for the concentrated water stream can comprise one or more holes in the bottom support none of which are coated with an ionic polymer functionally connected to a power supply.

It can be convenient to locate the outlet(s) for the concentrated water stream at the periphery of the bottom support. In this embodiment, the centrally located matrix creates an ion depletion zone and forces the ions and impurities to the periphery of the device. Alternatively, the outlet for the concentrated water stream can be located in the wall of the chamber, proximate to the bottom support.

The cathode of the device can be functionally connected to the ion concentration polarization matrix via an electrolyte solution disposed within the chamber.

The invention provides for a parallelized microporous separation device comprising:
- at least one separation chamber 8 in fluid communication with a brine source 9; and
- at least one separation core 5 comprising an anode 1, an insulation layer 10, and a cathode 12, and an ion concentration polarization matrix with ion selective material 2 in between; and
- an electrical power supply functionally connected to anode and cathode; and
- at least one fluid outlet 13 that is blocked or affected by an ion concentration polarization zone created by the said ion concentration polarization matrix (e.g coated with an ion-selective material); and
- at least one fluid outlet 14 that is not blocked nor affected by ion concentration polarization zone created by the said ion concentration polarization matrix;
- wherein separation of ions, molecules, and/or particles are achieved by the differential interaction between the said ions, molecules, and/or particles with ion concentration polarization zone, with different ions, molecules and/or particles exiting different fluid outlets.

The invention also provides for methods of purifying water, separating ions from water or concentrating ions in water. The methods comprise the steps:
a. Adding water comprising ions to a device described herein through the inlet port;
b. Supplying a voltage, such as at least 20 volts, thereby creating an ion depletion zone in the chamber above the porous ion concentration polarization matrix;
whereby desalted water flows through the ion depletion zone and porous ion concentration polarization matrix and is collected from the device and concentrated salt water is collected from the at least one outlet therefor.

The flow rate of water through the device can be about 1 mL per minute or more, preferably about 5 mL/min or more.

The water comprising ions that can be subjected to the method is selected from seawater, brackish water, or a biological sample, such as blood, protein, virus, pathogen, DNA, and/or heavy metals such as arsenic, cadmium and lead.

Figure 1:
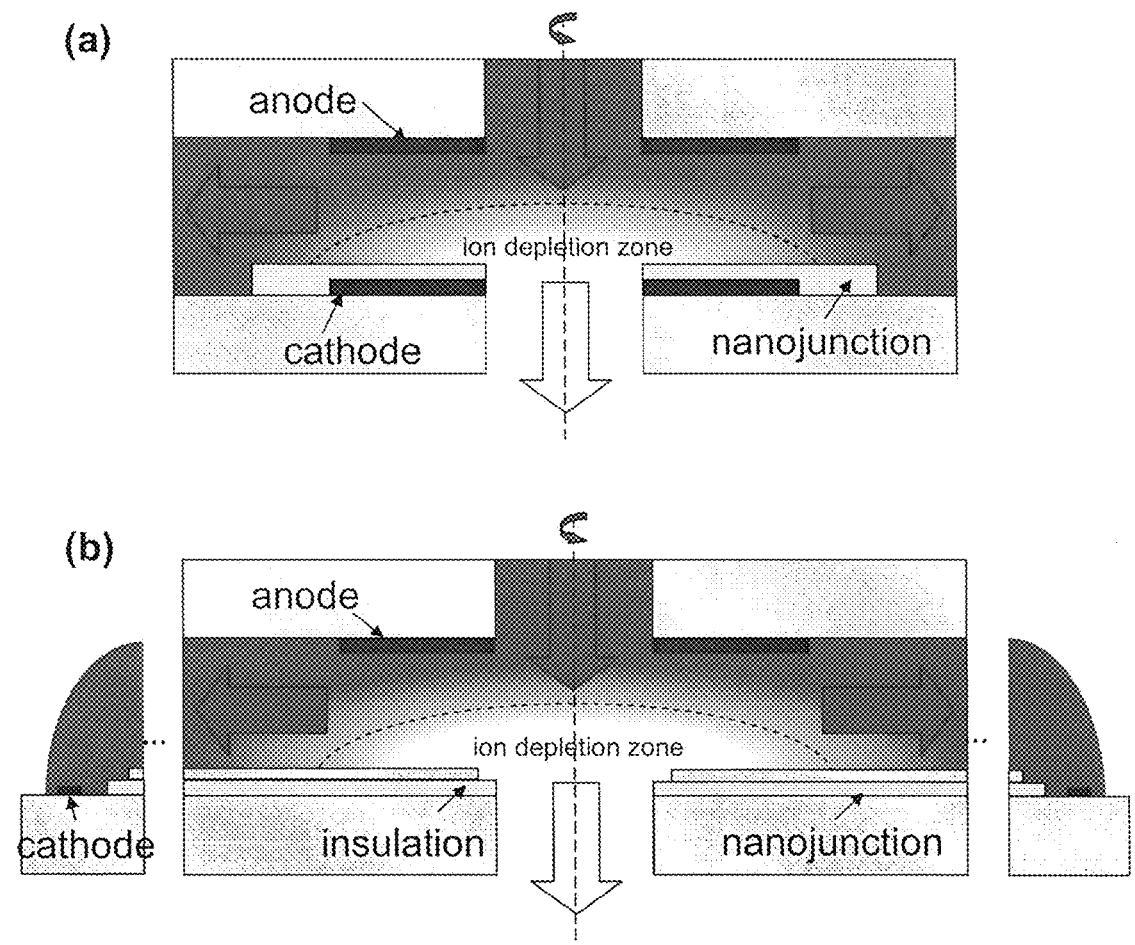
FIG. 1 depicts schematic diagrams of (a) metal buffered and (b) self-buffered multiplexed desalination system.

One embodiment of the purification/separation device utilizes direct vertical feeding of source water and lets only pure water flow down to a collection chamber by creating an ICP zone around bottom outlet holes as shown in FIG. 1. A metal buffer system such as that shown in FIG. 1(a) enables a simpler design than the first generation device since ICP can initiate directly from a nanojunction right on the deposited metal (or conducting mesh). A metal buffer system can work with low concentration samples (less than 100 mM) but becomes unsuitable at higher concentrations due to serious bubble formation on the cathode side. Compared to the metal buffer system, the self-buffering system as shown in FIG. 1(b) provides a bubble-free environment inside the separation chamber. Since conductivity of nanoporous junction (Nafion in this device) is much higher than sample electrolyte solution (20 times greater than seawater (500 mM) sample), most of the electrical current can pass through nanojunction, not directly through the solution so that ICP can still be initiated around the outlet holes. Bubbles due to electrolysis can be generated around cathodes without substantially impacting the ICP zone and separation since the electrodes are located outside the separation chamber. In this design, a fine meshwork (~100 μm mesh holes) of Nafion-coated cathode interacts with a more coarse mesh (~300 μm mesh holes) serving as the anode to create a dense array of ion-depletion zones within few inch circular structure such as wafer. Essentially, this improved design provides for dramatic parallelization of the ICP phenomena and is closer to the vertical feeding system such as those found in household water purifiers. For example, around $2 \times 10^6$ holes can serve individual ICP separator so that the flow rate coming out from 8 inch wafer stack could be 1~10 L/min.

These vertical approaches have several advantages in terms of multiplexing and manufacturability. First of all, since it utilizes vertical inlet/outlet, multiplication of these holes can be implemented in mesh type structures. In terms of integration, mesh structures are already the most efficient due to minimization of loss of unused (or useless) surface area. The brine stream travels above the ICP zone and slips toward the edge of the device so that the fluid channeling for separation of brine/fresh water is relatively easy. For manufacturability, fabrication processes of fine structures involves only non-lithographical methods such as utilizing commercially available conducting/non-conducting mesh and printed circuit board (PCB), etc. One-inch diameter stacks are massively parallelized but can also be massively parallelized themselves into variably sized arrays, to provide water flows for any type of demand from facility scale (e.g. a laboratory) to municipal scale (e.g. aircraft carrier). One hundred stacks can operate from the power required of a standard incandescent light bulb (<3.5 Wh/L product water capacity), yet provide >1 gallon/min of product water from seawater. In addition, such an embodiment doesn't have nano-scale shrinkage and bonding issues due to its macro-scale and mechanical sealing.

Figure 2:
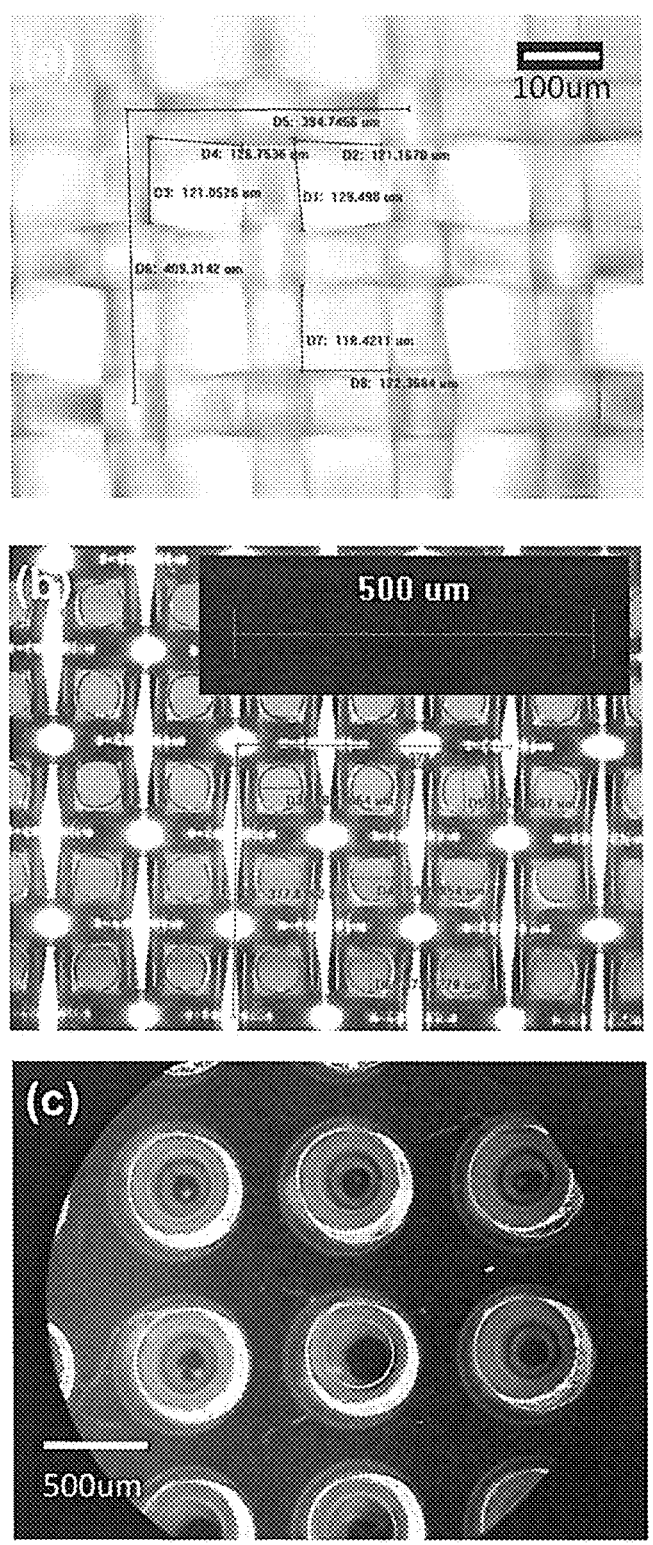
FIG. 2 depicts Nafion coated meshes: (a) Nylon woven mesh of 125 μm hole, (b) stainless steel mesh of 75 μm opening and (c) PCB of 500 μm drilling hole.

Commercially available metal/plastic meshes or PCB can be used for core substrates for the multiplexed desalination device. Meshes provide the best integration efficiency while one can design PCB for customizing flow properties. FIG. 2 shows various Nafion coated meshes: (a) Nylon woven mesh (Industrial Netting) with 125 um hole, (b) stainless steel mesh (Dual Manufacturing inc.) with 75 μm hole, and (c) PCB (Advanced Circuits) with 500 μm hole. The coating processes are as follows: Dipping into 20 wt % Nafion resin solution (Sigma Aldrich), followed by scrubbing and removing excess resin. Nitrogen gas is then blown so that individual holes do not remain clogged with resin. Drying at room temperature (1 hour) and baking at 75° C. on a hotplate were needed for complete curing of the resin.

FIG. 3(a) shows the metal buffer system employing printed circuit boards, or PCB. It comprises two PCB plates (1) and (2), film spacer (3) and inlet chamber (4). The top and bottom PCB served as anode and cathode, respectively. The bottom PCB was coated with 20 wt % ionic polymer, such as Nafion or other sulfonated tetrafluoroethylene based fluoropolymer-copolymer, by aforementioned manner so that ICP zones were created at the individual desalted outlet holes with applying voltage. FIG. 3(b) shows a bottom PCB with dimensions of 2 inch (width)×2.5 inch (length)×1/31 inch (thickness), although other dimensions can be used. This board had 456 desalted holes (diameter=300 μm) and 20 brine holes (diameter=500 μm) so that the two streams could equally split. One can arbitrarily design the number of each group of holes, e.g., for 1:1 division. Several stacks of commercial Mylar (3M Over Head Projector film) was used for the spacer (400 μm thick spacer was used in this device.)

However, the non-transparency of the PCB didn't allow one to observe inside, and flow controlling and splitting were more difficult than if the materials had been more transparent. More importantly, there were large areas of waste due to PCB fabrication/cost limit (only 456 holes in 1 inch diameter) leading to a limited flow rate. In some sense, this could be an advantage of PCB if one completed the investigation of control parameter because one can design the hole spacing and shape, etc. to suit specific needs. Meshes (or nets), as shown in FIGS. 2(a) and 2(b), could be a better choice of filter to maximize the flow rate and economic cost.

Figure 4:
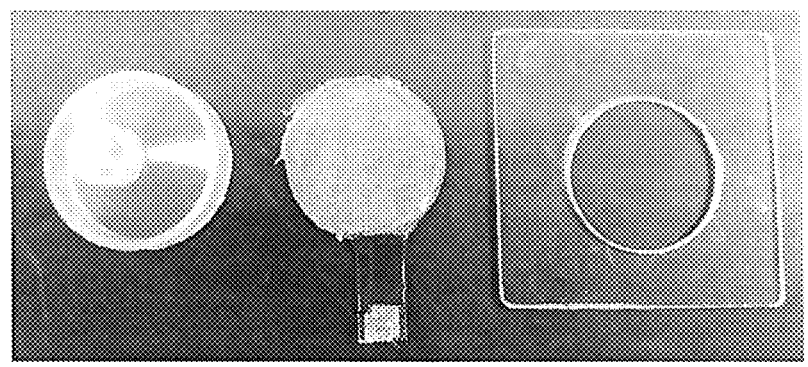
FIG. 4 depicts fabrication of metal buffer system employing commercial metal mesh: (a) top cap part, (b) bottom filter part, and (c) conductivities vs. electrical voltage plot to show the desalting efficiency.
Figure 4:
Figure 4:
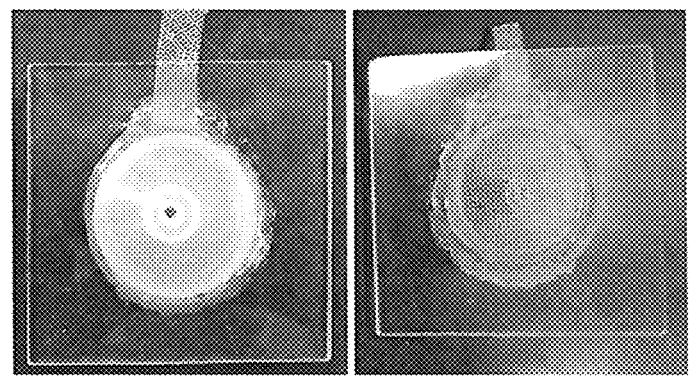
Figure 4:
Figure 4:
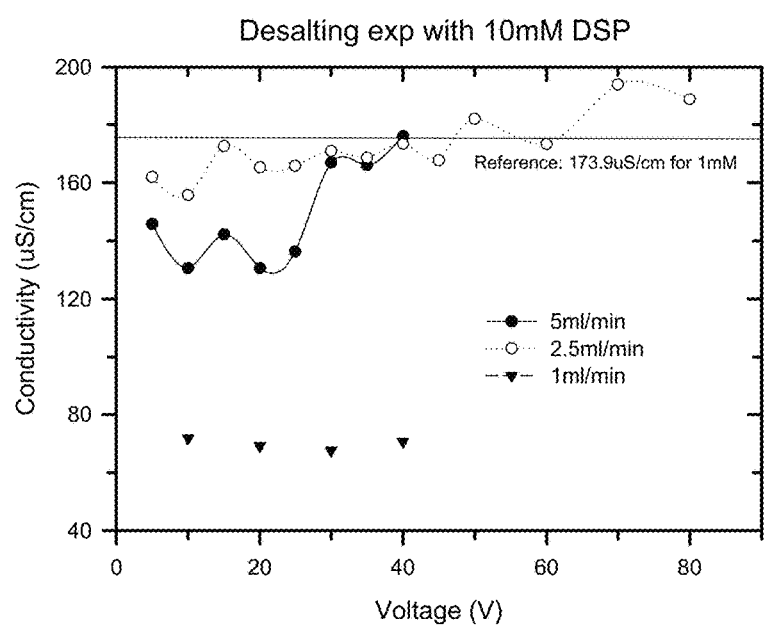

With the metal buffer system scheme, the metal mesh system was fabricated as shown in FIG. 4. FIG. 4(a) shows the anodic compartment which consisted of base metal mesh (1 inch diameter and 500 μm hole diameter), an acrylic plate (1/32 inch thick) and plastic chamber. The mesh was sandwiched between the chamber and the plate. For the cathodic compartment, a thin OHP film-Nafion coated metal mesh (anode)-collecting chamber was assembled as shown in FIG. 4(b). The diameter of anodic metal mesh was ½ inch (smaller than anodic mesh) so that brine outlets were placed along the ¾ inch perimeter. Since the film in this example was too flexible, another rigid plastic plate could be used to support the film for the assembly. FIG. 4(c) shows the demonstration of desalting 10 mM sodium phosphate buffer solution at high flow rate. Though the flow feeding of 5 mL/min and 2.5 mL/min were too high to be desalted, we can successfully (around 70%) desalt the solution at 1 mL/min. However, the metal buffer system was not suitable to desalt at highly concentrated source water since bubble generations were too severe due to electrolysis.

Figure 5:
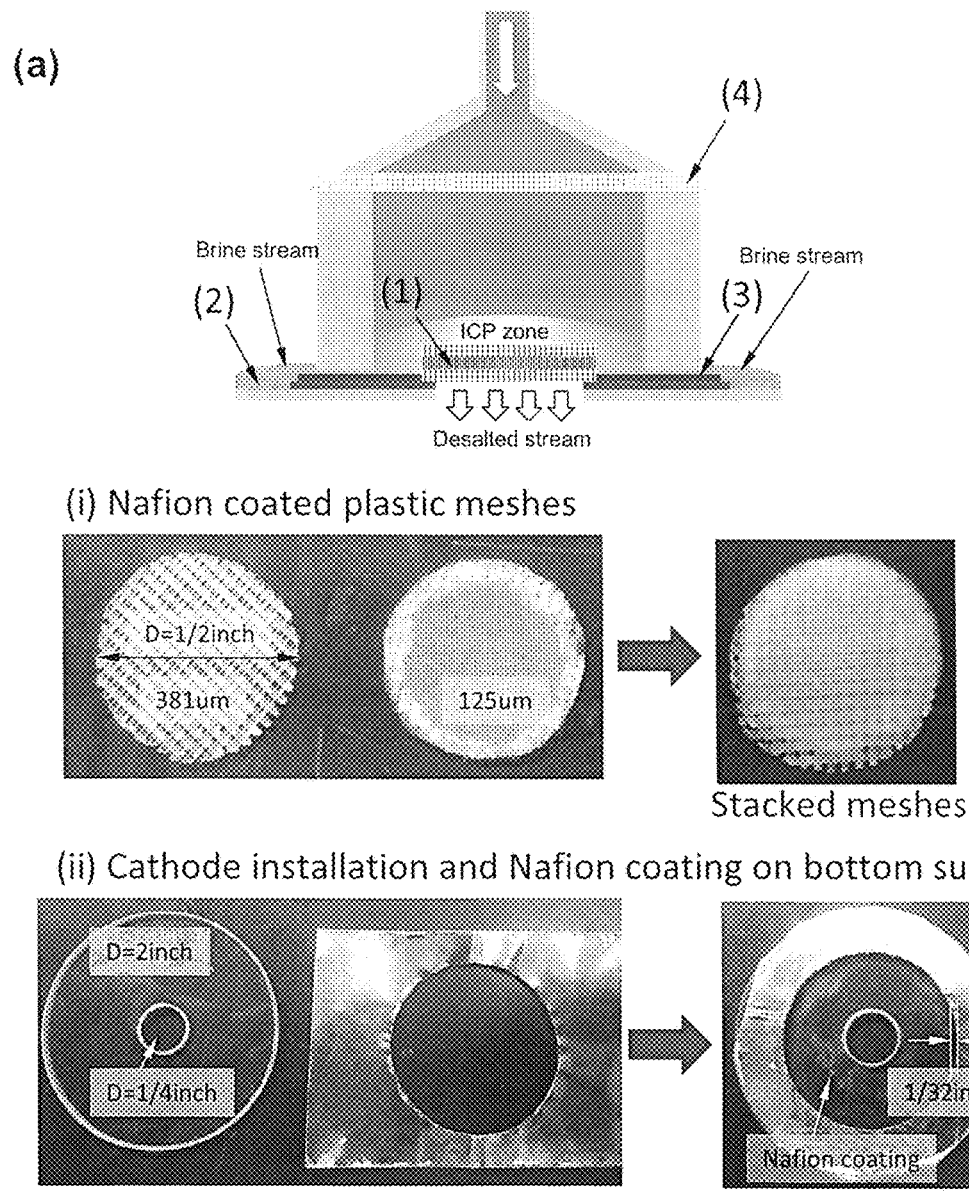
FIG. 5 depicts (a) schematic diagram of ¼ inch outlet prototype (not to scale) and its building block, (i)~(iv) the fabrication steps for each building block.
Figure 5:
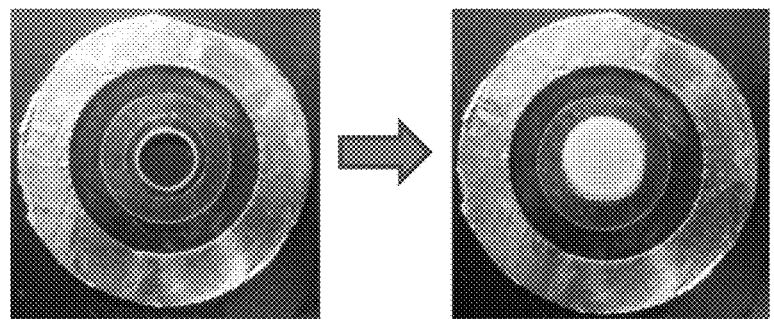
Figure 5:
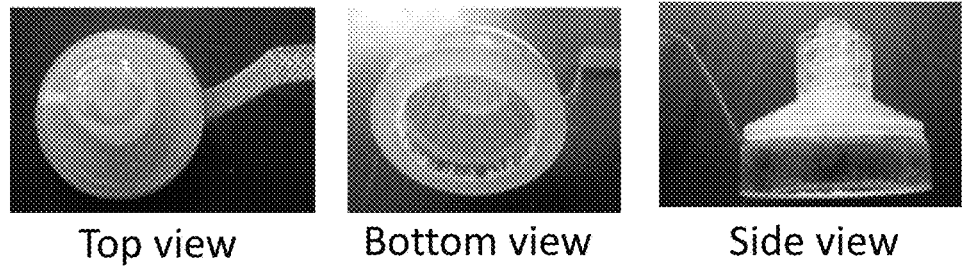

To the contrary, the self-buffered system provides a bubble-free environment inside the ICP chamber since the bubbles should form at the cathodic side located outside the chamber. FIG. 5 depicts the fabrication of an embodiment employing a self-buffered system. It consists of four parts: (1) Nafion coated core meshes, (2) Cathode, (3) Nafion coated bottom plastic substrate, and (4) Cap part that had bare metal mesh (anode). Details were as follows: (i) Nafion solution was applied for coating the meshes by aforementioned method. Fine mesh (125 μm holes and diameter=½ inch) was sandwiched between two coarse meshes (381 μm holes and diameter=½ inch) in order to create microfluidic environment near the meshes. The stabilization of ICP phenomenon is enhanced by a bottleneck structure 10, thus a coarse-fine-coarse sandwich will serve for preventing an instability. Super glue (Home Depot) was applied for bonding each mesh. (ii) A piece of FlexiGlass (Home Depot) was round cut (diameter=2 inch) and outlet hole (¼ inch) was drilled at the center for fresh water drain. Aluminum (or copper) tape (Home depot) as a cathode was attached around the rim of the bottom plastic piece. Another Nafion coating was done by brushing with proper mask so that 1/32 inch gap between Nafion coating and cathode was maintained. (iii) Commercially available over-head projector (OHP) film was round cut for insulating layer and then, the mesh stack, OHP film and the bottom plastic piece were bonded by Super glue. Additional Nafion solution may be applied for guaranteeing electrical connections. (iv) Clear Extruded Acrylic Round Tube (McMaster, OD=1 inch, ID=¾ inch and length=¼ inch) was used for the chamber. At the bottom of the tube, we sawed 8 notches for brine outlet. Due to the transparency, the direct observation of depletion zone was possible through a side view. Coarse metal mesh as anode was sandwiched between the chamber and 20 mL plastic syringe head.

Figure 6:
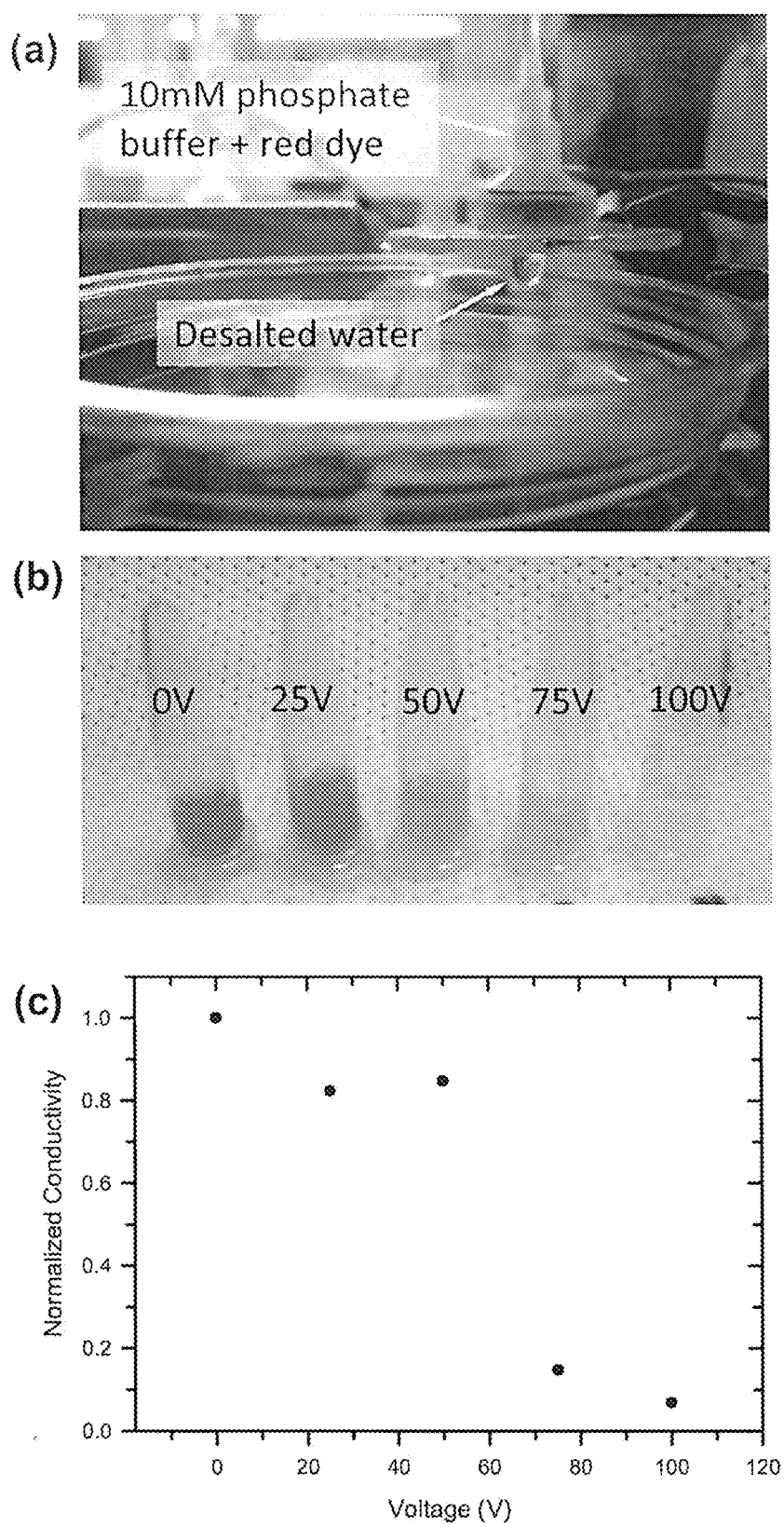
FIG. 6 depicts (a) ICP desalination demonstration and the analysis of desalted water by (b) optical comparison, and (c) electrical conductivity measurement.

FIG. 6 depicts a prototype of the just-described embodiment being used for desalination. For initial performance check, 10 mM phosphate buffer solution with red dye was used as source water. Electrical voltage was applied by Keithley 236 source measure unit in the range of 1~110 V and a syringe pump (Harvard apparatus, PHD 2000) was connected to the prototype head. The flow rate was set to 0.25 mL/min. As shown in FIG. 6(a), outlet water turned to be clear, while inlet water was red. Dissolved red dyes were eliminated from the source water as applied voltage increased and it was almost clear above 100 V as shown in FIG. 6(b). To confirm the salt removal, the conductivities of desalted water were measured using a conductivity meter (VWR, symphony pH/conductivity meter) since the electrical conductivity is linearly proportional to an electrolyte concentration. It showed that the conductivity of desalted water was dropped to 95% at 100 V which was equal to 95% salt removal efficiency.

Figure 7:
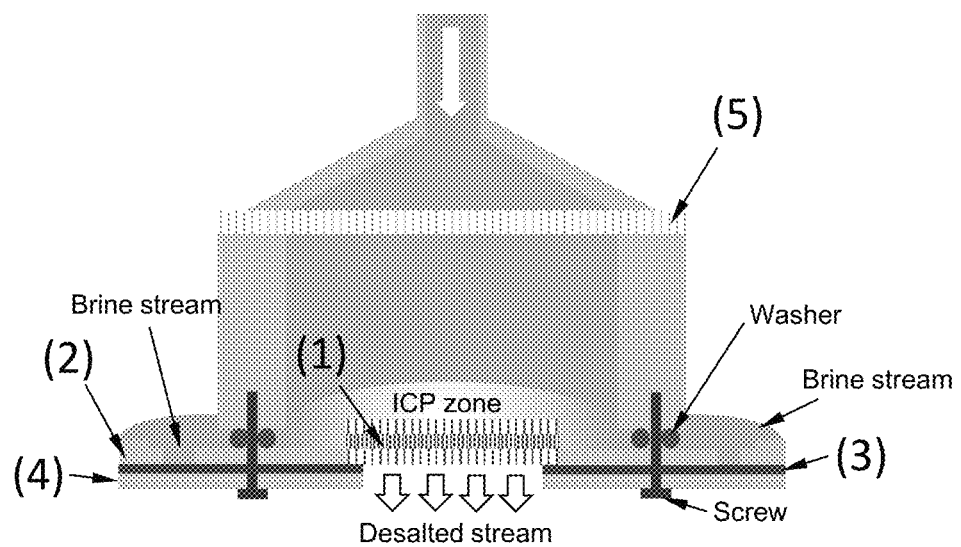
FIG. 7 depicts schematic diagram of Nafion sheet sandwiched self-buffered system and its fabrication steps.
Figure 8:
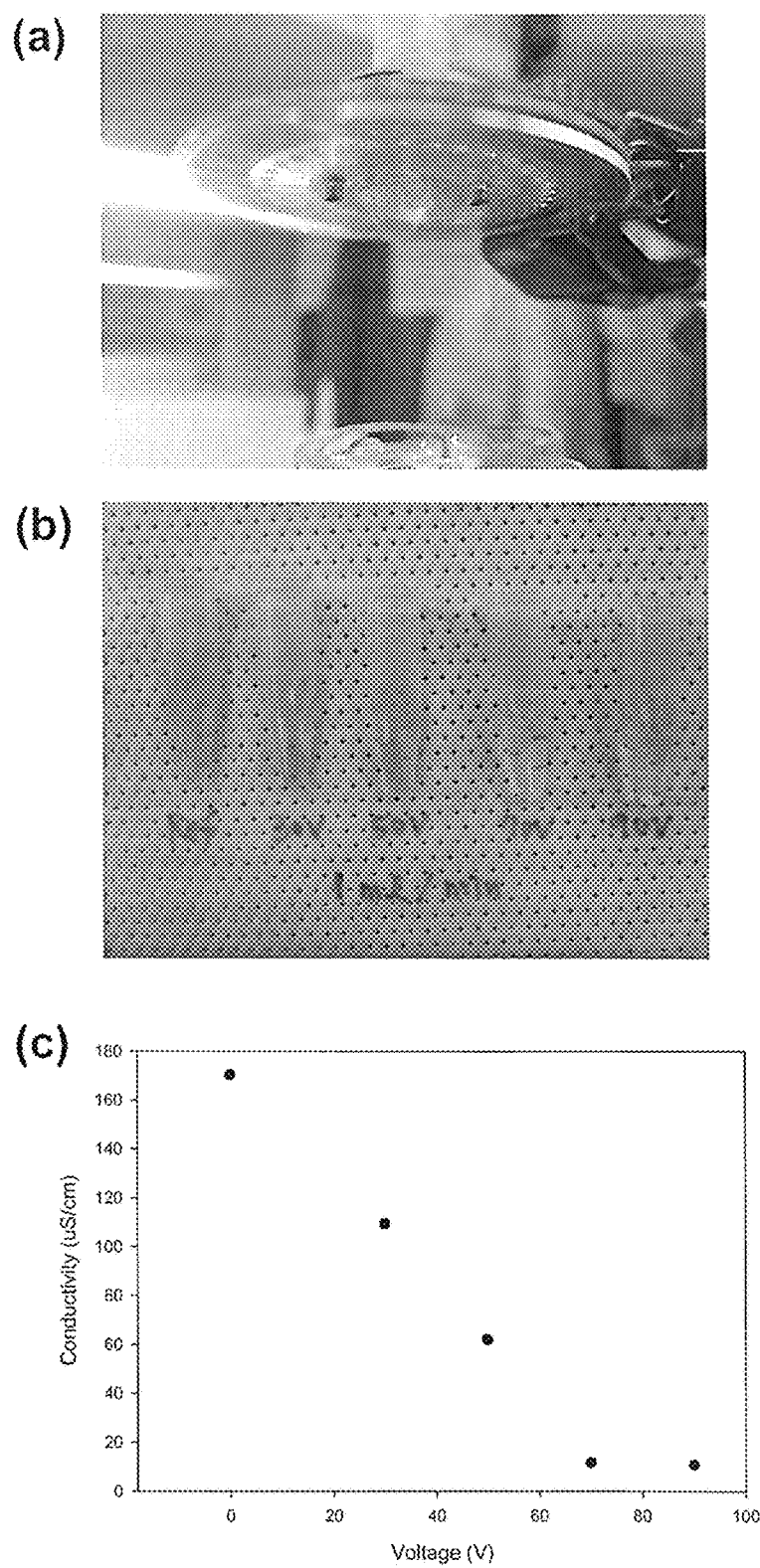
FIG. 8 depicts (a) ICP desalination demonstration and the analysis of desalted water by (b) optical comparison, and (c) electrical conductivity measurement.

In yet another embodiment, another self-buffered system designed to minimize manual fabrication, and with enhanced precision and reusability was developed as shown in FIG. 7. It consists of the following parts: (1) Nafion coated core meshes, (2) Upper plastic plate (1/32 inch thickness) with copper (or aluminum) tape as cathode, (3) Nafion sheet (Ion power, 10 mil), (4) bottom plastic plate (1/32 inch thickness) and (5) Cap part that had bare metal mesh (anode). Details of fabrications were as following. In order to obtain uniform thickness of Nafion coating, commercially available Nafion sheet was sandwiched between two plastic plates instead of brushing Nafion solution. The center hole of bottom plate was slightly (1/32 inch) smaller than top plate so that the stepped structure can hold Nafion coated plastic mesh stack. Copper (or aluminum) film was taped around the rim. Nafion sheet and the copper foil could contact each other through liquid filled in the radially positioned group of holes. Three holes around the center hole were placed for tightening with cap part. By placing several washers, we can control the amount of liquid leaking, i.e. brine flow. Final assembled prototype with top cap was shown in. FIG. 8(a) shows the desalting operation demonstration with 10 mM sodium phosphate buffer solution and yellow food dye. The color becomes gradually clear as a function of applied voltage (FIG. 8(b)). Corresponding electrical conductivities were also decreased as shown in FIG. 8(c) and 95% of salts were finally removed at 90 V of applied voltage.

As shown in FIG. 9(a), conductivity increments (blue dots) from brine stream were also plotted with calculated values (black dotted line) from the conductivity difference between source water and filtered stream. Since the collection of brine stream retained from 0V, the measured increments of conductivity (blue dots) were lower than estimated values (dotted line). FIG. 9(b) shows conductivity changes of modeled seawater (yellow dye was intentionally mixed) as a function of applied electrical voltage. In both cases, the contents of the filtered stream dropped below the safe requirement, once the electric field value reached the threshold. This also coincided with the colorimetric observation. All experiments were repeated more than 5 times during more than 10 hours of operation by a single prototype to get reliable data points.

We tested direct heavy metal removal using the prototype device with the filtered-stream outlet size of 3/8 inch diameter. External power supply (Keithley 236 source measure unit) and syringe pump (set to 1 mL/min; Harvard PHD 2000) were connected to the prototype. The system was horizontally set up over the collection bottle. Direct way to monitor the operation is the continuous measurement of electric current through the system. Since the generation of ICP zone rapidly increases the electrical resistance, one can typically observe a precipitous current drop (about two orders of magnitude) within a few seconds for normal operation, followed by a slower decrease thereafter. Both initial and steady-state current values depend on the salinity of the source water, and applied voltage. The common failure modes of the system include; i) no ICP generation, caused by electrical breakdown or shortage, in which case there will not be any current drop, ii) unbalancing between the input flow and the electric field, resulting in salt leakage through the mesh. ICP zone can be disrupted or destroyed if subjected under excessive flow speed, either locally (at some holes of the mesh) or globally. In such cases, one can observe a higher steady-state current or unsteady current profile long after the beginning of the operation.

We prepared a water sample, mimicking the ionic components of metal contaminated Bangladeshi groundwater for testing our system. The resulting source water sample contained As3+ and As5+ (initially 500 ppb for each Arsenic ion) and Cd2+ and Pb2+ (initially 200 ppb for each ion). To quantify the concentration of each ion species in the purified water sample, an Agilent 7700x Inductively Coupled Plasma-Mass Spectrometer (Agilent Technologies) was employed. Also Pb and Cd detection kit (Invitrogen, Measure-iT™ Assay kit) and Arsenic detection kit (HACH co., EZ High Range Test Kit) were used to detect the amount of remaining substances. FIG. 9(a) showed the conductivity drop and concentration changes as a function of applied voltage. Majority ion concentrations (such as Na+ and Cl−) were monitored by conductivity measurement, which showed a precipitous drop once the electric voltage was applied. On the other hand, the conductivity increased at the brine stream, confirming that actual separation of salts from the desalted stream into the brine stream has occurred. At 80V, the concentrations of As5+, As3+, Cd2+ and Pb2+ were down to 5.76 ppb, 4.90 ppb, 4.26 ppb and 3.97 ppb which are below WHO's suggested safe level (As5+: 10 ppb, As3+: 10 ppb, Cd2+: 5 ppb and Pb2+: 15 ppb)[13] showing >99% overall removal efficiency. It was shown that As (M.W. 74.92160) were removed more efficiently than Pb (M.W. 207.2) or Cd (M.W. 112.411) potentially due to the inherent mobility differences. The power requirement was measured to be 0.5~0.8 Wh/L for this groundwater sample. After a single purification process, the concentration of heavy metal and salts can be doubled with 50% recovery. If dirty water at the initial salt concentration of 10 mM (heavy metal contaminated groundwater) is filtered, we would get approximately 20 mM of concentrated brine with half of initial volume. Then we can put this concentrated water into the system again to get 40 mM of more concentrated brine yielding 75% recovery in total. In the same manner (repeating the process with brines at each step), we can increase the recovery and minimize the volume of brine as needed. However, this cascade concept is not tested in this work due to serious safety issues with highly concentrated heavy metals in an academic level laboratory. In addition to the multi-stage ICP purification scheme described above, we also can achieve high water recovery by controlling flow rate ratio of desalted/concentrated water. While we do not demonstrate high water recovery with large-scale device, in our previous experiments[21], we have shown this water recovery can be achieved up to 99.5% (i.e. 200-fold). Since the processing volume of contaminated water in this manuscript and future portable applications is not too huge (less than 30 L/day) compared to plant scale reverse osmosis (usually produces fresh water at greater than 105 tons/day), we believe that concentrated brine from our device merely has critical impact to the environment. Also the nature of ICP does not require the cleaning process necessary for reverse-osmosis membranes since it utilizes a "pushing" force from the membrane, i.e. fouling-free process. If the core membrane is worn out, we can easily replace the membrane since the price is low. Based on the aforementioned differences, ICP purification process has completely different application areas compared to existing RO process.

Figure 9:
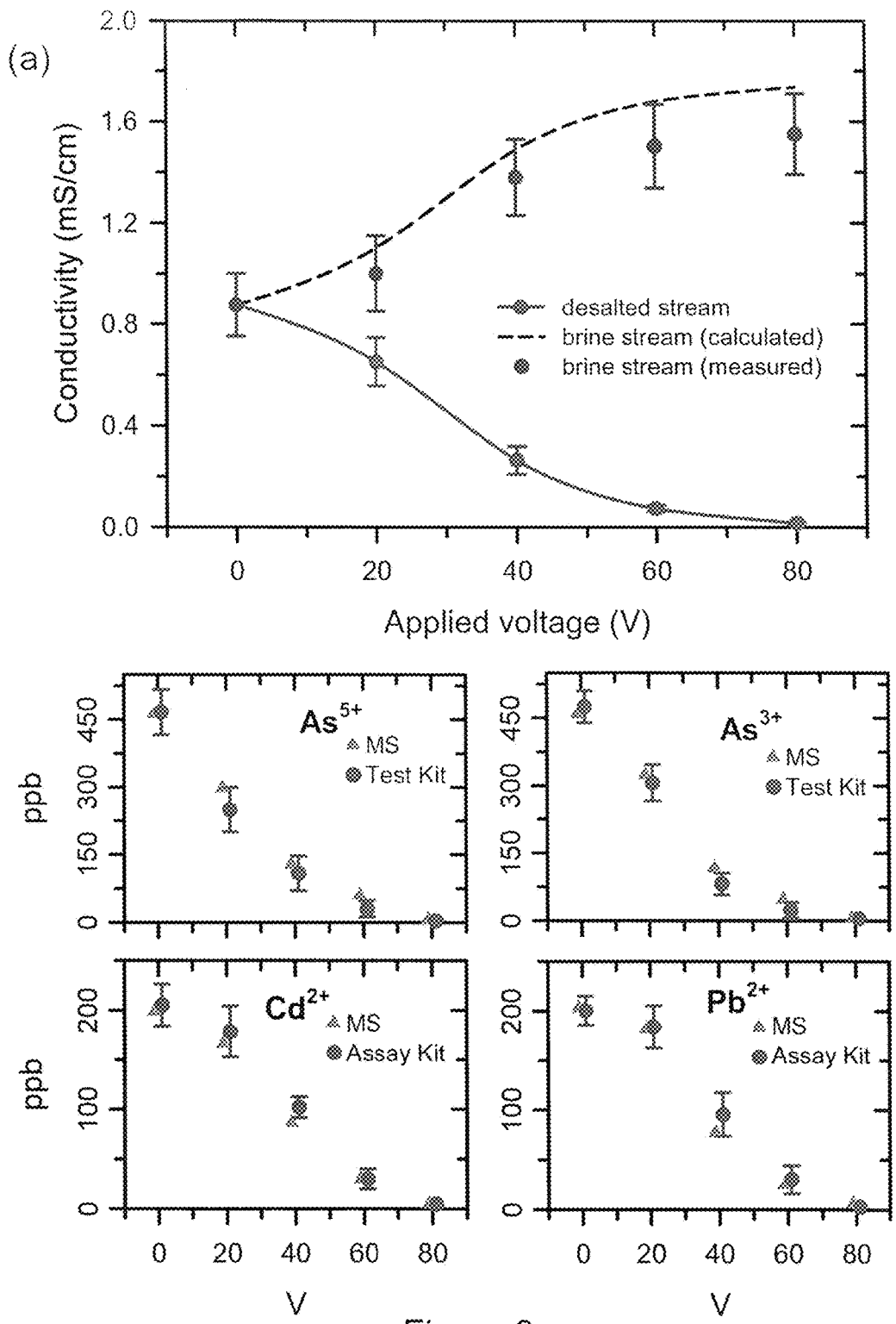
FIG. 9 depicts (a) conductivity and concentration of each heavy metal species from filtered samples as a function of applied electrical voltage.
Figure 9:
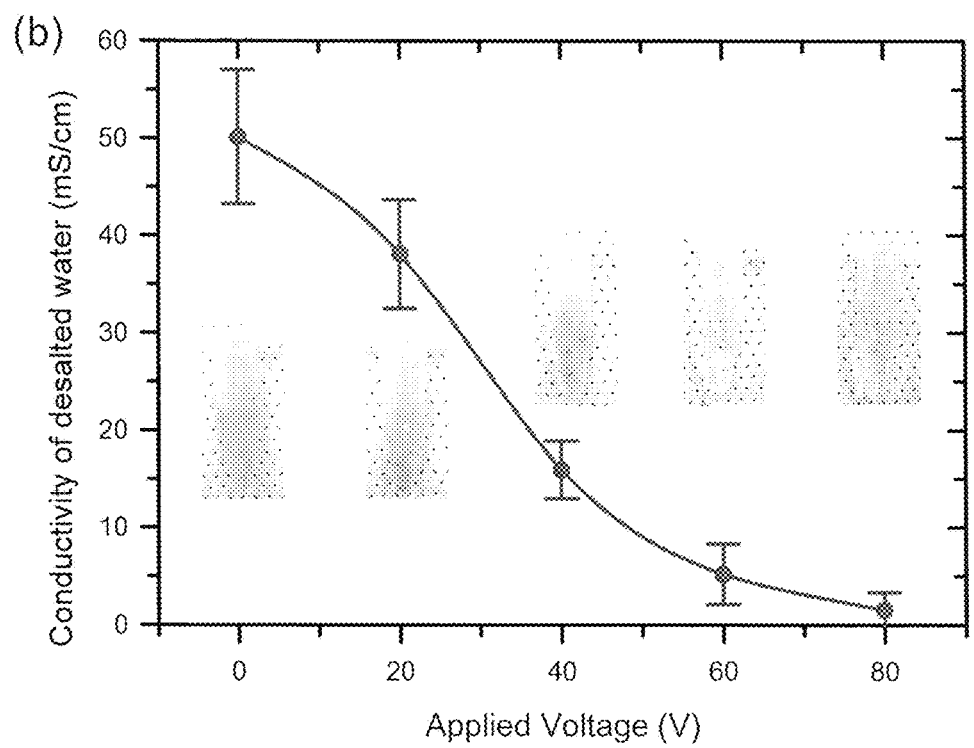

In addition to heavy metal removal, seawater desalination in this prototype device was also demonstrated. Sodium chloride solution of 500 mM (30,000 mg/L) was prepared as a model for seawater and introduced into the same prototype device with the input flow rate of 1 mL/min. Due to the high salt concentration there was a small fluctuation of steady-state current signal during the desalting operation. These variations could be minimized by reducing electrical resistance of electrode and proper choice of high-end performance nanoporous material. Still, as shown in FIG. 9($b$), the conductivity of initial sample (~50 mS/cm) was reduced down to less than 1 mS/cm (corresponding to 10 mM or 600 mg/L TDS, below the drinkable water criterion[13]), demonstrating over 98% salt removal efficiency (recovery rate ~50%). The small current fluctuation we observed in this experiment may signify a localized leakage (compromised ICP zone) of salt caused by high salt concentration of the source water. This means that a local failure in the mesh does not lead to a systemic operational failure, but simply lowers the removal efficiency in a graded fashion. Such feature would be critically important for reliability when one consider a massive parallelization of the unit device (our prototype) into much higher flow systems. Required power was measured to be around 5 Wh/L, which is comparable to previous single microfluidic system's efficiency[6] and current state-of-art reverse osmosis plant system[1].

REFERENCES

1 Shannon, M. A. et al. Science and technology for water purification in the coming decades. Nature 452, 301-310 (2008).
2 Organization, W. H. Guidelines for Drinking-water Quality. (WHO, Geneva, 2008).
3 Probstein, R. F. Physicochemical Hydrodynamics: An Introduction. (Wiley-Interscience, 1994).
4 Kim, S. J., Wang, Y.-C., Lee, J. H., Jang, H. & Han, J. Concentration Polarization and Nonlinear Electrokinetic Flow near Nanofluidic Channel. Phys. Rev. Lett. 99, 044501, doi:10.1103/Phys Rev Lett. 99.044501 (2007).
5 Pu, Q., Yun, J., Temkin, H. & Liu, S. Ion-Enrichment and Ion-Depletion Effect of Nanochannel Structures. Nano Lett. 4, 1099-1103 (2004).
6 Kim, S. J., Ko, S. H., Kang, K. H. & Han, J. Direct seawater desalination by ion concentration polarization. Nat. Nanotech. 5, 297-301 (2010).
7 Kim, S. J. & Han, J. Amplified Electrokinetic Fluid Pumping Switching and Desalting. Internation patent PCT/US/2009/51420 (2011).
8 Ko, S. H., Kim, S. J. & Han, J. Method for Building Massively-Parallel Preconcentration Device for Multiplexed, High-Throughput Applications. International patent PCT/US2011/027883 (2011).
9 Kim, S. J. & Han, J. Methods for Fabricating Electrokinetic Concentration Devices. U.S. patent Ser. No. 12/409, 447 (2009).
10 Jarup, L. Hazards of heavy metal contamination. Br. Med. Bull. 68, 167-182, doi:10.1093/bmb/ldg032 (2003).
11 Momodu, M. A., and Anyakora, C. A. Heavy Metal Contamination of Ground Water: The Surulere Case Study. Research Journal of Environmental and Earth Sciences 2, 39-43 (2010).
12 Argos, M. et al. Arsenic exposure from drinking water, and all-cause and chronic-disease mortalities in Bangladesh (HEALS): a prospective cohort study. Lancet 376, 252-258, doi:10.1016/s0140-6736(10)60481-3 (2010).
13 World Health Organization. 4-7 (New Delhi: WHO Regional Office of South-East Asia 2010).
14 Benguella, B. & Benaissa, H. Cadmium removal from aqueous solutions by chitin: kinetic and equilibrium studies. Water Research 36, 2463-2474 (2002).
15 US Environmental Protection Agency. (2009).
16 Ahmed, M. F. in International Workshop on Technologies for Arsenic Removal from Drinking Water 251-269 (2000).
17 Sutherland, D., Kabir, O. & Chowdhury, N. A. in International Workshop on Technologies for Arsenic Removal from Drinking Water 190-200 (2000).
18 Ali, M. A. et al. in Internation Workshop on Technologies for Arsenic Removal from Drinking Water 99-120 (2000).
19 US Environmental Protection Agency. (2000).
20 Ali, I., Khan, T. A. & Asim, M. Removal of Arsenic from Water by Electrocoagulation and Electrodialysis Techniques. Sep. Purif. Rev. 40, 25-42, doi:10.1080/15422119.2011.542738 (2011).
21 Kwak, R., Kim, S. J. & Han, J. Continuous-flow biomolecule and cell concentrator by ion concentration polarization. Anal. Chem. 83, 7348-7355 (2011).

While this invention has been particularly shown and described with references to preferred embodiments thereof, it will be understood by those skilled in the art that various changes in form and details may be made therein without departing from the scope of the invention encompassed by the appended claims.

We claim:

1. A water separation device comprising:
a chamber comprising an inlet port, a bottom support and a volume to receive water comprising ions to be separated;
wherein said bottom support comprises a porous ion concentration polarization matrix comprising at least one layer of a mesh with holes partially or entirely coated with an ion selective material, said matrix configured to permit water depleted in said ions to exit the chamber and at least one outlet for a concentrated water stream comprising said ions;
at least one anode;
at least one cathode in electrical contact with said ion concentration polarization matrix;
wherein the volume to receive the water comprising ions is located above the bottom support such that gravity directs the water comprising ions through the chamber and water depleted in said ions through the ion concentration polarization matrix.

2. The device of claim 1 wherein the anode is comprised of a conductive metal mesh and is positioned proximate to the inlet port.

3. The device of claim 1 wherein the porous ion concentration polarization matrix comprises a two dimensional matrix of holes, wherein each hole is coated with an ion selective material.

4. The device of claim 3 wherein each hole has a diameter of less than about 500 microns.

5. The device of claim 1 wherein the mesh is electrically conductive.

6. The device of claim 1 wherein the mesh is electrically non-conductive.

7. A water separation device comprising:
a chamber comprising an inlet port, a bottom support and a volume to receive water comprising ions to be separated;
wherein said bottom support comprises a porous ion concentration polarization matrix configured to permit water depleted in said ions to exit the chamber and at least one outlet for a concentrated water stream comprising said ions;
at least one anode;
at least one cathode in electrical contact with said ion concentration polarization matrix;
wherein the matrix comprises a plurality of layers of mesh with holes partially or entirely coated with an ion selective material;
wherein the plurality of layers of mesh are characterized by at least two different hole sizes.

8. The device of claim 1 wherein the porous ion concentration polarization matrix comprises a plurality of microchannels of less than 100 nm in diameter.

9. The device of claim 1 wherein the ion concentration polarization matrix has a surface area of at least about 3 $cm^2$.

10. A water separation device comprising:
a chamber comprising an inlet port, a bottom support and a volume to receive water comprising ions to be separated;
wherein said bottom support comprises a porous ion concentration polarization matrix comprising at least one layer of a mesh with holes partially or entirely coated with an ion selective material, said matrix configured to permit water depleted in said ions to exit the chamber and at least one outlet for a concentrated water stream comprising said ions;
at least one anode;
at least one cathode in electrical contact with said ion concentration polarization matrix;
wherein the porous ion concentration polarization matrix comprises a two dimensional matrix of holes wherein each hole is coated with an ion selective material;
wherein the at least one outlet for the concentrated water stream comprises one or more holes in the bottom support none of which are coated with an ionic polymer in electrical contact with a power supply.

11. A water separation device comprising:
a chamber comprising an inlet port, a bottom support and a volume to receive water comprising ions to be separated;
wherein said bottom support comprises a porous ion concentration polarization matrix comprising at least one layer of a mesh with holes partially or entirely coated with an ion selective material, said matrix configured to permit water depleted in said ions to exit the chamber and at least one outlet for a concentrated water stream comprising said ions;
at least one anode;
at least one cathode in electrical contact with said ion concentration polarization matrix;
wherein the at least one outlet for the concentrated water stream is located at the periphery of the bottom support.

12. A water separation device comprising:
a chamber comprising an inlet port, a bottom support and a volume to receive water comprising ions to be separated;
wherein said bottom support comprises a porous ion concentration polarization matrix comprising at least one layer of a mesh with holes partially or entirely coated with an ion selective material, said matrix configured to permit water depleted in said ions to exit the chamber and at least one outlet for a concentrated water stream comprising said ions;
at least one anode;
at least one cathode in electrical contact with said ion concentration polarization matrix;
wherein the at least one outlet for the concentrated water stream is located in the wall of the chamber, proximate to the bottom support.

13. The device of claim 1 wherein the at least one cathode is in electrical contact with the ion concentration polarization matrix via an electrolyte solution disposed within the chamber.

14. The device of claim 1 wherein the water comprises cells, particulates, emulsions, biomolecules or combinations thereof.

15. The device of claim 4 wherein each hole has a diameter of less than about 300 microns.

16. The device of claim 1 wherein the matrix comprises a mesh characterized by holes having a diameter of about 100 microns.

17. The device of claim 1 wherein the ion concentration polarization matrix has a surface area of at least about 5 $cm^2$.

18. The device of claim 1 wherein the ion concentration polarization matrix has a surface area of at least about 200 $cm^2$.

19. The device of claim 1 wherein the volume and matrix are configured to be capable of accommodating a water flow rate of about 1 mL per minute or more.

20. The device of claim 1 wherein the volume and matrix are configured to be capable of accommodating a water flow rate of about 5 mL per minute or more.

* * * * *